US006891844B1

(12) United States Patent
Ueno

(10) Patent No.: US 6,891,844 B1
(45) Date of Patent: May 10, 2005

(54) SUBSCRIBER NETWORK SYSTEM AND METHOD OF SETTING INFORMATION IN CONCENTRATOR THEREOF

(75) Inventor: Hiroshi Ueno, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 09/332,996

(22) Filed: Jun. 15, 1999

(30) Foreign Application Priority Data

Jun. 17, 1998 (JP) .......................................... 10-169069

(51) Int. Cl.⁷ .............................................. H04L 12/28
(52) U.S. Cl. ..................................... 370/410; 370/422
(58) Field of Search ......................... 370/395.1, 395.31, 370/395.7, 397, 399, 409, 410, 422, 426, 474, 535, 536, 537, 538, 539, 540, 541, 542, 543, 544, 545

(56) References Cited

U.S. PATENT DOCUMENTS

| 5,506,847 A | * | 4/1996 | Shobatake ................... 370/338 |
| 5,568,479 A | * | 10/1996 | Watanabe et al. ........... 370/399 |
| 5,896,511 A | * | 4/1999 | Manning et al. ............. 709/232 |
| 6,111,858 A | * | 8/2000 | Greaves et al. ............. 370/256 |
| 6,226,265 B1 | * | 5/2001 | Nakamichi et al. .......... 370/235 |
| 6,331,982 B1 | * | 12/2001 | Watanabe ..................... 370/399 |
| 6,496,513 B1 | * | 12/2002 | Takamichi ................... 370/434 |

FOREIGN PATENT DOCUMENTS

| JP | 4-211546 | 8/1992 |
| JP | 7-264205 | 10/1995 |
| JP | 8-125661 | 5/1996 |
| JP | 10-145386 | 5/1998 |
| JP | 10-150449 | 6/1998 |

OTHER PUBLICATIONS

Fried, J.; A VLSI chip set for burst and fast ATM switching; Communications, 1989. ICC 89, BOSTONICC/89. Conference record. World Prosperity Through Communications, IEEE International Conference on , Jun. 11–14, 1989 page(s): 128–135 vol. 1.*

NTT Technology Journal, vol. 8, No. 5, (May 1996), pp. 64–66.

* cited by examiner

Primary Examiner—Chi Pham
Assistant Examiner—Keith M. George
(74) Attorney, Agent, or Firm—Harrity & Snyder, LLP

(57) ABSTRACT

A subscriber network system is provided with is capable of reducing the response time and reducing the device cost. In the subscriber network system, a control cell is generated which includes modified information when modification is caused for the filter table 230 of the cell filter 24-1 to 24-n in the ATM concentrator 200. The cell filters 24-1 to 24-n of the ATM concentrator 200 distribute the cells input through the cell inserting and dividing portion 210 to the subscribers. The control cell terminating portion 220 terminates the control cell supplied from the ATM exchange 100. The filter table 230 stores the setting information for the cell filters 24-1 to 24-n in the control cell terminated at the control cell terminated at the control cell terminating portion 220.

10 Claims, 7 Drawing Sheets

SUBSCRIBER NETWORK SYSTEM AND METHOD OF SETTING INFORMATION IN CONCENTRATOR THEREOF

BACKGROUND OF THE INVENTION

1. Field of the Invention

The present invention relates to a subscriber network system and method of setting in-device information in a concentrator thereof, and particularly relates to a method of setting in-device information in an ATM (Asynchronous Transfer Mode) concentrator in a subscriber network system comprised of an ATM exchange and an ATM concentrator disposed at remote locations.

2. Background Art

In the subscriber network system comprised of an ATM exchange arranged in a central telephone station and an ATM concentrator at remote locations, it is preferable that the ATM concentrators are provided in large quantities close to subscribers are simple in structure and are obtainable at a reduced cost.

When considering a multi-cast service which distributes a signal with the same content to a plurality of subscribers, it is preferable to distribute the signal at the ATM concentrator which forms branching points to each subscriber from the point of view of efficient utilization of transmission band.

When it is desired to satisfy the above condition in a SVC (Switched Virtual Connection) service which executes dynamic signal setting, it becomes necessary to send and receive the path setting information from an ATM exchange implementing signaling processing to each ATM concentrator.

For example, as shown in FIG. 7, in a subscriber network system comprising an ATM exchange 100 and an ATM concentrator 200, one of the solutions will be the use of a communication line (a control information transmission line) between a device control portion 150 in the ATM exchange 100 and a device control portion 270 in the ATM concentrator 200.

Here, the ATM exchange 100 is connected to the ATM network 300 through the ATM transmission line 1, and is also connected to the ATM concentrator 200 through the ATM transmission line 2. In addition, the ATM concentrators are connected to a plurality of subscribers through the ATM transmission lines 3-1 to 3-n.

The ATM exchange 100 comprises a cell switch 110, a call control processing portion 120, an device control portion 150, and the ATM concentrator 200 comprises a cell inserting and separating portion 210, a filter table 230, cell filters 24-1 to 24-n, and a device control portion 270.

A technique using a construction similar to the above subscriber network system has been disclosed in Japanese Patent Application, First Publication No. Hei 9-168014. This application discloses a method in which signaling is carried out by one ATM exchange, and line information is set for small ATM exchange.

In Japanese Patent Application, First Publication No. Hei 9-238148, a system is disclosed in which a control cell is used for controlling a subscriber side device (ONU: Optical Network Unit) in a PSD (Passive Double Star) system.

In the above system, although the control cell is used for controlling the subscriber side device, the control cell is originally used for monitoring the state of the subscriber side device and is not used for directly setting the subscriber side device.

Since an exclusive transmission line (control information transmission line) is used for transmission between the device control portion of the ATM exchange and the device control portion of the ATM concentrator in the above be, described conventional subscriber network system, problems are encountered in that it takes time until the set path is reflected when a high level control signal path is adopted, in that the ATM concentrator is required to execute complicated processing, and in that the cost of the concentrators increases.

Therefore, the objects of the present invention are to solve the above problems, and to provide a subscriber network system which is capable of reducing the response time and which is capable of reducing the device cost.

SUMMARY OF THE INVENTION

The present invention provides a subscriber network system comprising an exchange disposed in the central telephone station and concentrators disposed at remote locations, and the present subscriber network system is provided with a cell generating means disposed in said concentrators for integrating setting information to be set in said concentrators in a cell data and for sending the cell data to said concentrators; and a control cell terminating means disposed in said concentrators for extracting said setting information from said cell data supplied from said cell generating means and for rewriting setting information in said concentrators.

The present invention also provides a method of setting in-device information of the concentrator of the subscriber network system comprising the exchange arranged in the central station and concentrators located at remote locations, and the method comprises the steps of integrating in the cell data setting information to be set in the concentrators in the cell data and sending the integrated cell data to said concentrators; and extracting said setting information in said cell data supplied from said exchange and rewriting setting information installed in said concentrators.

That is, the subscriber network system of the present invention performs rapid setting of the setting information obtained by the call control of the ATM exchange for the ATM concentrator using the ATM cell.

More practically, when modification of the setting information occurs as a result of the call control processing (the signaling processing), the control cell generating portion in the ATM exchange generates a control cell in which addresses and data in the filter table to be set in the ATM concentrator are mapped in the ATM cell, and the control cell is sent to the ATM concentrator.

The control cell terminating portion of the ATM concentrator extracts information including addresses, data, and writing and reading information and directly rewrites the content of the tables to be set (the filter table and the monitoring parameter table). Direct rewriting of those tables in the ATM concentrator to be set from the ATM exchange makes it possible to reduce the response time.

In the present invention, the normal setting and the control of the concentrator is made by the control center, and the setting data which changes dynamically by the signaling are set from the ATM exchange, so that the response time can be reduced.

Furthermore, in the present invention, CPU (Central Processing Unit) of the ATM exchange sends an instruction to rewrite the information of the table to be set based on the setting information obtained in the ATM exchange such that the ATM concentrator performs setting without using any software. Thereby, a rapid setting is realized and the device cost of the ATM concentrator can be reduced by simplifying its function.

DETAILED DESCRIPTION OF THE PREFERRED EMBODIMENTS)

Figure 1:
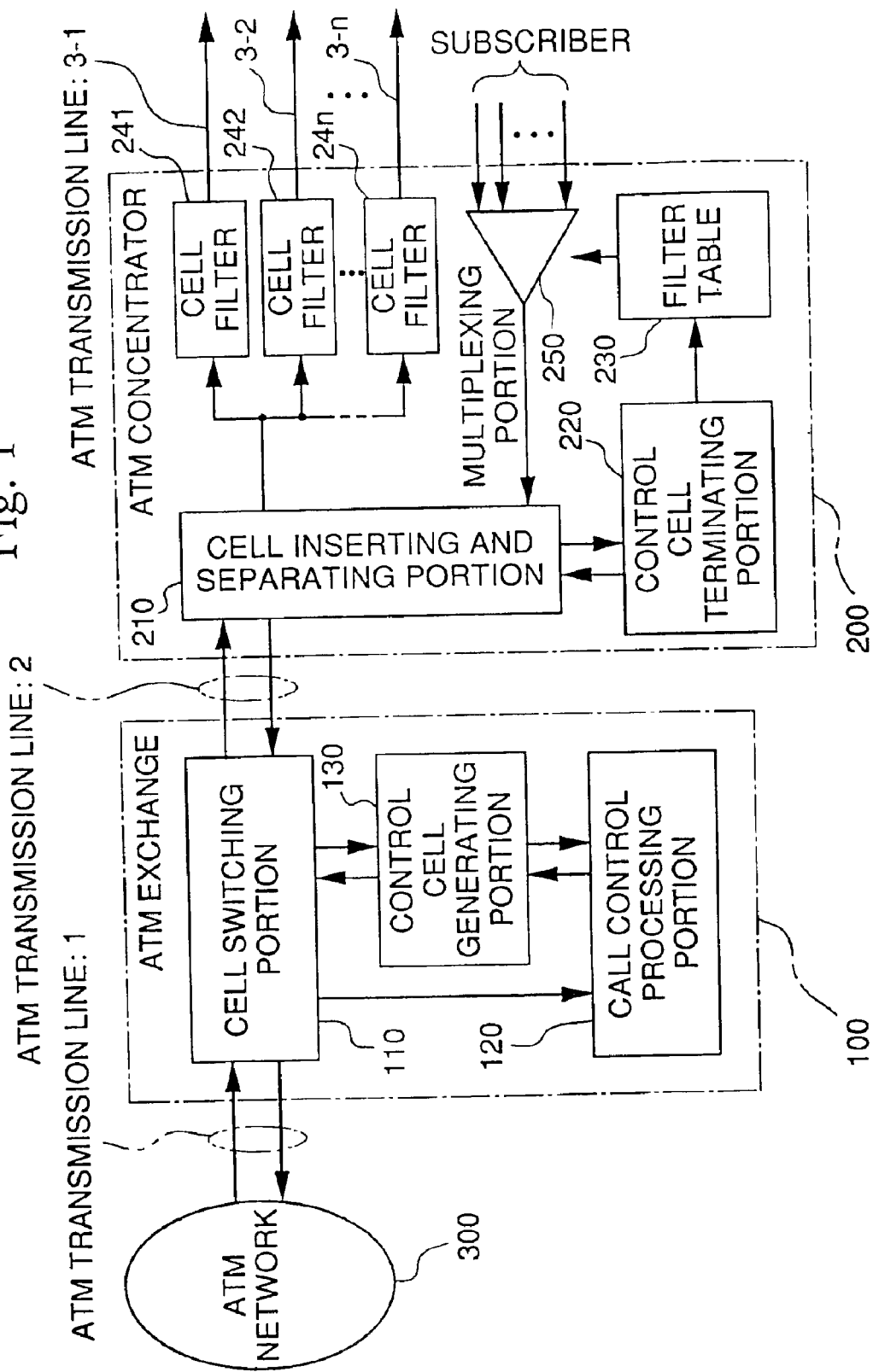
FIG. 1 is a block diagram showing the construction of a subscriber network system according to one embodiment of the present invention.

Embodiments of the preset invention will be described with reference to the attached drawings. FIG. 1 is a diagram showing the structure of the subscriber network system according to one embodiment of the present invention. As shown in FIG. 1, the subscriber network system according to the first embodiment of the present invention comprises an ATM exchange 100, an ATM concentrator 200, and an ATM network 300.

The ATM exchange 100 comprises a cell switch portion 110, a call control portion 120, and a control cell generating portion 130. The ATM concentrator 200 comprises a cell inserting and separating portion 210, a control cell end portion 220, a filter table 230, cell filters 24-1 to 24-n and a multiplexing portion 200.

In the above ATM network, the ATM exchange 100 and the ATM concentrator 200 are connected by the ATM transmission lines. The ATM exchange 100 is connected to the ATM network through the ATM transmission line 1.

The call control processing portion 120 of the ATM exchange 100 conducts the call control by the signal cell which is divided by the ATM cell switching portion 110. The control cell generating portion 130 generates a control cell in which information about a change is embedded, when a change in the filter table 230 of the cell filters 241 to 24n for the ATM concentrator 200 is required as a result of the call control by the call control processing portion 120.

In contrast, the cell filters 24-1 to 24-n of the ATM concentrator 200 distribute the cell to the subscribers by means of the VPI (Virtual Path Identifier) through the ATM cell inserting and separating portion 210. The control cell terminating portion 220 terminates the control cell supplied from the ATM exchange 100.

The filter table 230 stores set information for the cell filters 241 to 24n. The multiplexing portion 250 multiplexes signals from the subscribers. The ATM cell inserting and separating portion 210 inserts a control cell from the control cell terminating portion 220 into the signal from the multiplexing portion 250.

Figure 2:
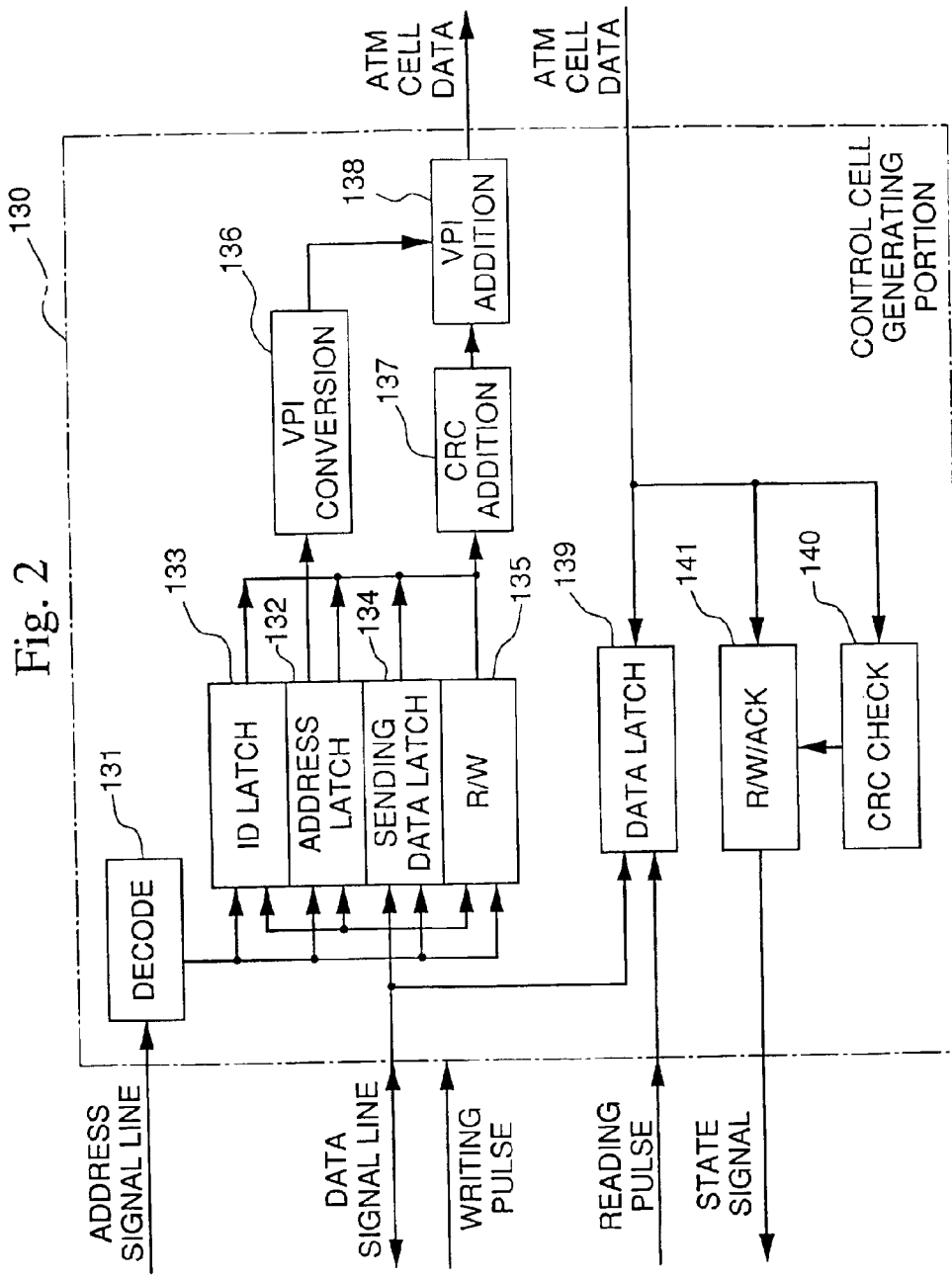
FIG. 2 is a block diagram showing the structure of the control cell generating portion shown in FIG. 1.

FIG. 2 is a block diagram showing the structure of the control cell generating portion shown in FIG. 1. Referring to FIG. 2, the control cell generating portion 130 comprises a decoding portion 131, an address latching portion 132, ID (Identification) latching portion 133, a data latching portion 134, a R/W (Read/Write) information latching portion 135, a VPI converting portion 136, a CRC (Cyclic Redundancy Check) adding portion 137, a VPI adding portion 138, a data latching portion 139, a CRC checking portion 140, and a R/W/ACK (Acknowledge) judging portion 141.

The decoding portion 131 decodes the address signal lines. The address latching portion 132, the ID latching portion 133, the data latching portion 134, and the R/W information latching portion 135 stores the signals on the data bus in the register and temporarily stores the necessary data.

The CRC adding portion 137 reads a data train which is latched one time, adds a CRC mark, and further adds a VPI (a VPI which is converted at the VPI converting portion 136). The control cell generating portion 130 generates the control cells by those portions and sends those cells to the cell switching portion 110, and the cell switching portion 110 sends those cells to the ATM concentrator 200.

Furthermore, the data latching portion 139 maintains the data returned from the ATM concentrator 200, and the R/W/ACK judging portion 141 indicates the content of the returned data, and the CRC checking portion 140 judges whether or not the returned data is correct.

Figure 3:
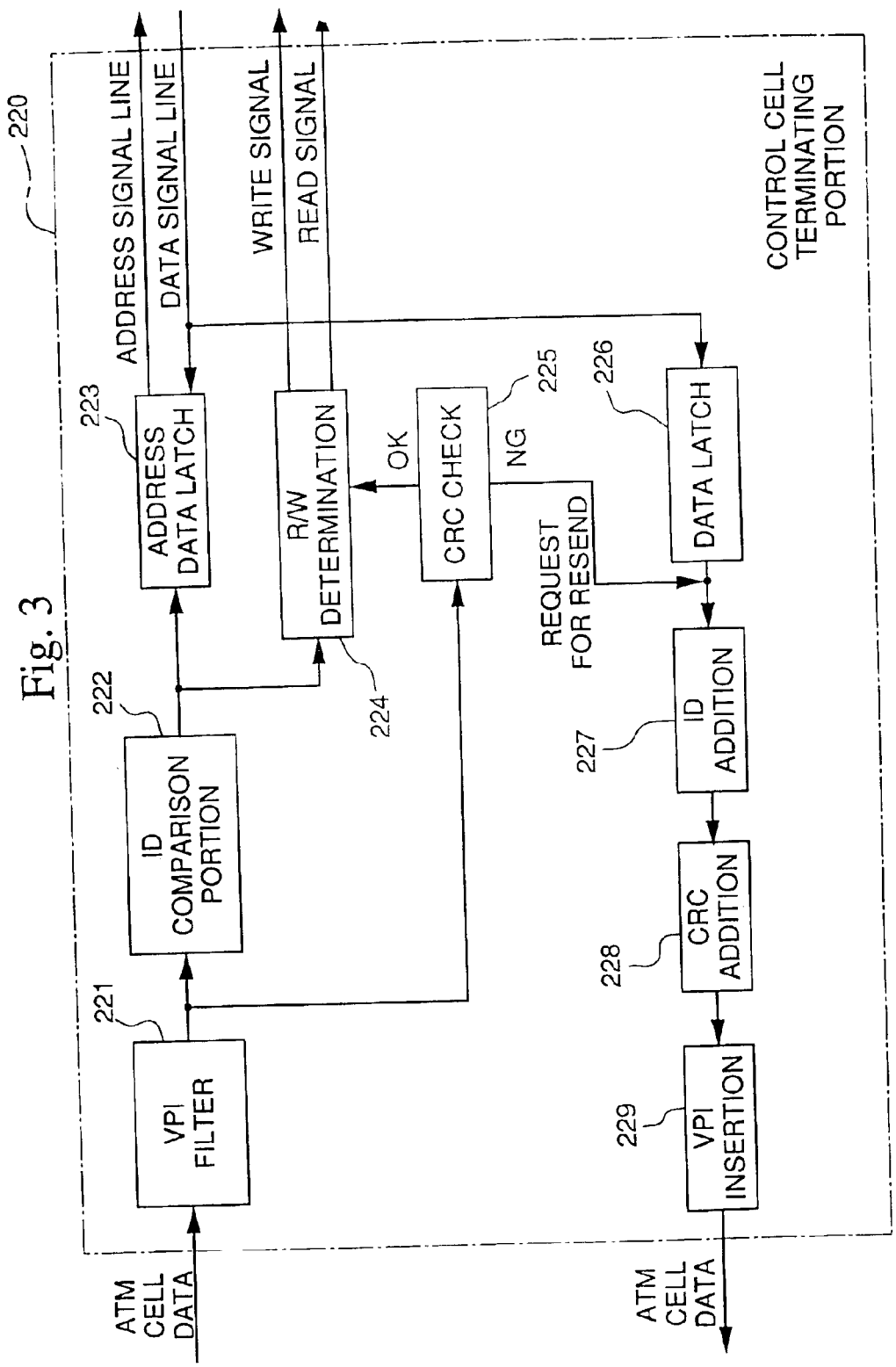
FIG. 3 is a block diagram showing the structure of the control cell terminating portion shown in FIG. 1.

FIG. 3 is a block diagram showing the structure of the control cell terminating portion 220 shown in FIG. 1. As shown in FIG. 3, the control cell terminating portion 220 comprises a VPI filter portion 221, an ID comparison portion 222, an address/data latching portion 223, a R/W judging portion 224, a CRC checking portion 225, a data latching portion 226, an ID adding portion 227, a CRC adding portion 228, and a VPI inserting portion 229.

A VPI filter portion 221 of the control cell terminating portion 220 receives the ATM cell data which the ATM concentrator 200 receives from the ATM exchange and filters, this ATM cell data so as to pass only the VPI value for the control signals.

The ID comparison portion 222 compares the ID of the cell which passed the VPI filter 221 with its own ID.

The receiving portion of the end point of the control cell 220 comprises the VPI filter portion 221, the ID comparison portion 222, the address/data latching portion 223, the R/W judging portion 224, the CRC checking portion 226, the data latching portion 226, the ID adding portion 227, the CRC adding portion 228, and the VPI inserting portion 229.

The VPI filter portion 221 of the control cell terminating portion 220 receives the ATM cell data which the ATM concentrator 200 receives from the ATM exchange 100 and filers it so as to pass only the VPI values of the control signals. The ID comparison portion 222 compares the ID of the cell passed through the VPI filter 221 with its own ID.

The control cell terminating portion 220 comprises the VPI filter portion 221, the ID comparison portion 222, the address/data latching portion 223, and the R/W judging portion 224.

The receiving portion of the control cell terminating portion 220 analyses the content of the payload, and the address and the data are stored in the register. For this payload, parallel to the above analysis, the CRC checking portion 225 analyzes whether or not the data is effective.

For processing to issue the reading instruction cell and the response cell, the processor comprises the data latching portion 226 for holding the read data, the ID adding portion 227, the CRC adding portion 228, and the VPI inserting portion 229, and the ATM cell generated at this processor is sent to the ATM exchange 100 though the cell inserting portion 210.

Figure 4:
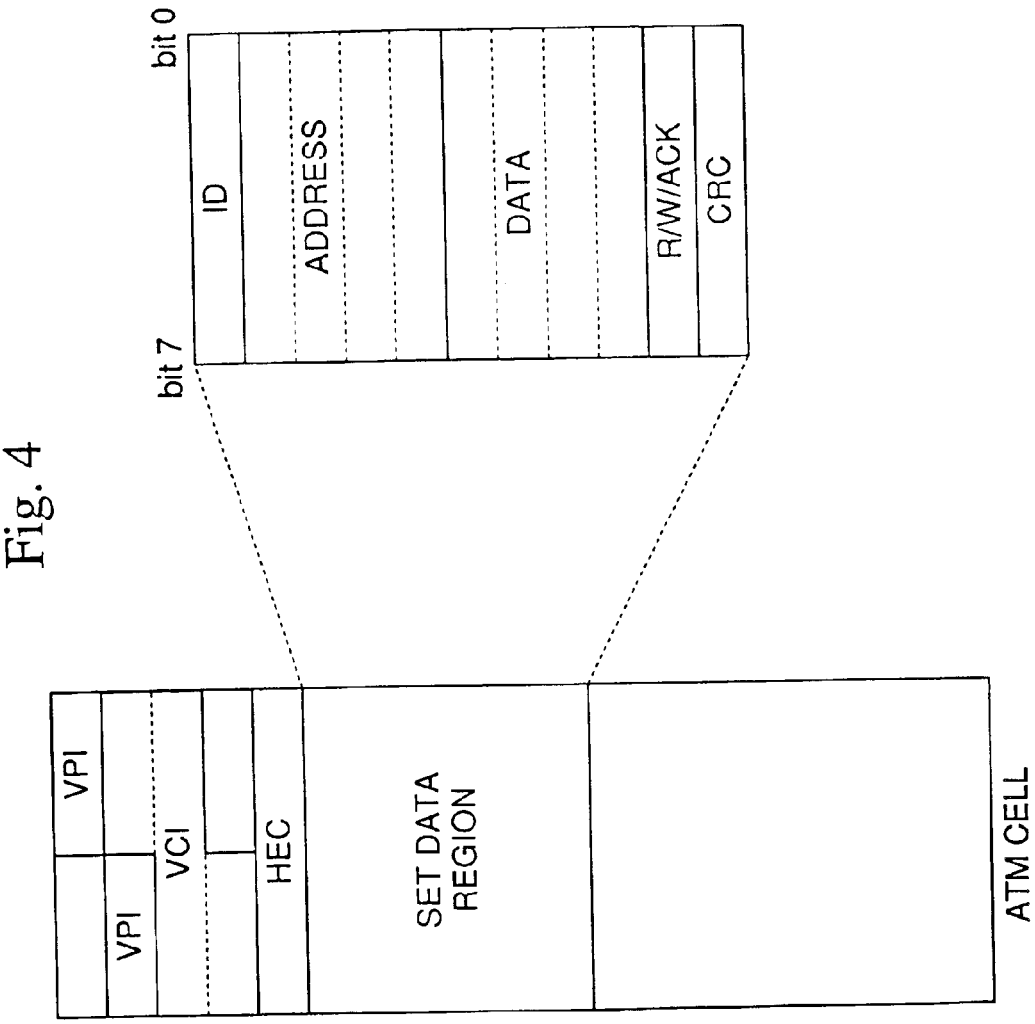
FIG. 4 is a block diagram showing an example of the format of the control cell used in the subscriber network system according to one embodiment of the present invention.

FIG. 4 is a block diagram showing an example of the format of the control cell used in the subscriber network system according to one embodiment of the present invention. As shown in FIG. 4, the payload portion comprises the ID of the apparatus, an address signal, a data signal, a air R/W/ACK conditional signal, and a field of the CRC mark.

When a subscriber requests a service of the connection by a signaling procedure, the signaling signal terminates at the ATM exchange 100 after passing through the ATM concentrator 200. As a result of signaling processing at the ATM exchange 110, it is understood that a subscriber line is added, and that the entry is added to the filter table 230 (a table with enumerated information of passing VPIs).

In this case, the software (which is included in the call control processing portion 120) of the ATM exchange 100 writes the address of the table, which the ATM concentrator 200 is required to rewrite, and the content of the table. Thereupon, the control cell generating portion 130 decodes the address of the writing instruction and allocates data signals derived from the data bus to respective registers for storing. The necessary data include the ID of the table to be set, addresses, data, and R/W information.

The above operations are the same as the I/O (input and output) operation from the CPU, and is carried out synchronized with the writing pulse, whereby the cell payload is formed, the CRC to the data is calculated, and this CRC is added to the payload.

That is, the data is read from the registers holding the above data in the data form shown in the setting data region and the CRC mark are calculated, and the CRC is added to the data. Furthermore, the VPI corresponding to the ID is added at the VPI adding portion 138, in order to connect with the apparatus having the address ID. The correspondence between the ID and the VPI is pre-registered in the VPI converting portion 136.

The ATM controlling cell generated by the above processing operation is sent to the cell switching portion 110. The cell switching portion 110 distributes the ATM controlling cell to a port connected to the ATM concentrator 200 to be set depending upon the VPI values and the ATM controlling cell is sent to the ATM concentrator 200 through the ATM transmission line 2. The VPI allocated to the control path is used as the VPI in between the cell switching portion 110 and the ATM concentrator 200.

The ATM concentrator 200 extracts only the ATM controlling cell by the use of the VPI filter portion 221 according to the VPI values allocated for the control path at the control cell end portion 220.

The ID comparison potion 222 judges whether or not the ID cell of the ATM controlling cell coincides with the own ID cell. If it is detected that the ID cell is identical to its own ID, the address, data, and R/W information are extracted from the ATM controlling cell and they are stored in the register temporarily.

Furthermore, the CRC of the data field is calculated and the CRC checking portion 225 checks whether or not the obtained CRC is the same as the value added by the sending side. If the CRC is the same, the CRC checking portion 225 determines that the sent data is correctly received. Accordingly, the address data latching portion 223 sets the address and the data stored in the register to the address signal line and the data signal line of the filter table 230, respectively, and the R/W judging portion 224 generates a writing signal or a reading signal. The R/W judging portion 224 determines whether the writing signal or the reading signal is generated according to the R/W bit.

The writing to the filter table 230 and the reading from the filter table 230 are carried out by the above described processing, similar to the I/O operation from CPU.

In the case of reading data, the data latching portion 226 latches the signal read from the filter table 230, and the field for the response cell is formed by the data read, the R/W/ACK bits, its own ID, a nd the CRC mark obtained by calculating the field, and the ATM cell is finally produced by addition of the VPI allocated for the control path.

The ATM concentrator 200 sends the thus produced ATM cell to the ATM exchange 100. The R/W bits of the response cell indicate the type of the received instruction, and the ACK bits are turned on (ON) when the results of the CRC check is correct, and are turned off (OFF) when the result of the CRC check is not correct. When the result of the CRC check is not correct, the ATM concentrator 200 returns the response cell in which the ACK bits is turned off, in order to communicate that the instruction from the ATM exchange has failed.

When the ATM exchange receives such a response cell, the ATM exchange performs the field analysis as well as the CRC check for validation of the correctness of the data. When the type of data is for reading and if the data is not correct, the received data are made invalid. When the type of data is for reading, and even if the data is not correct, the result is ignored. If the ACK data is not correct, it indicates that the setting to the ATM concentrator 200 has failed. Information of R/W/failure of the setting is maintained in a memory so as to be read by CPU as the state signal.

Figure 5:
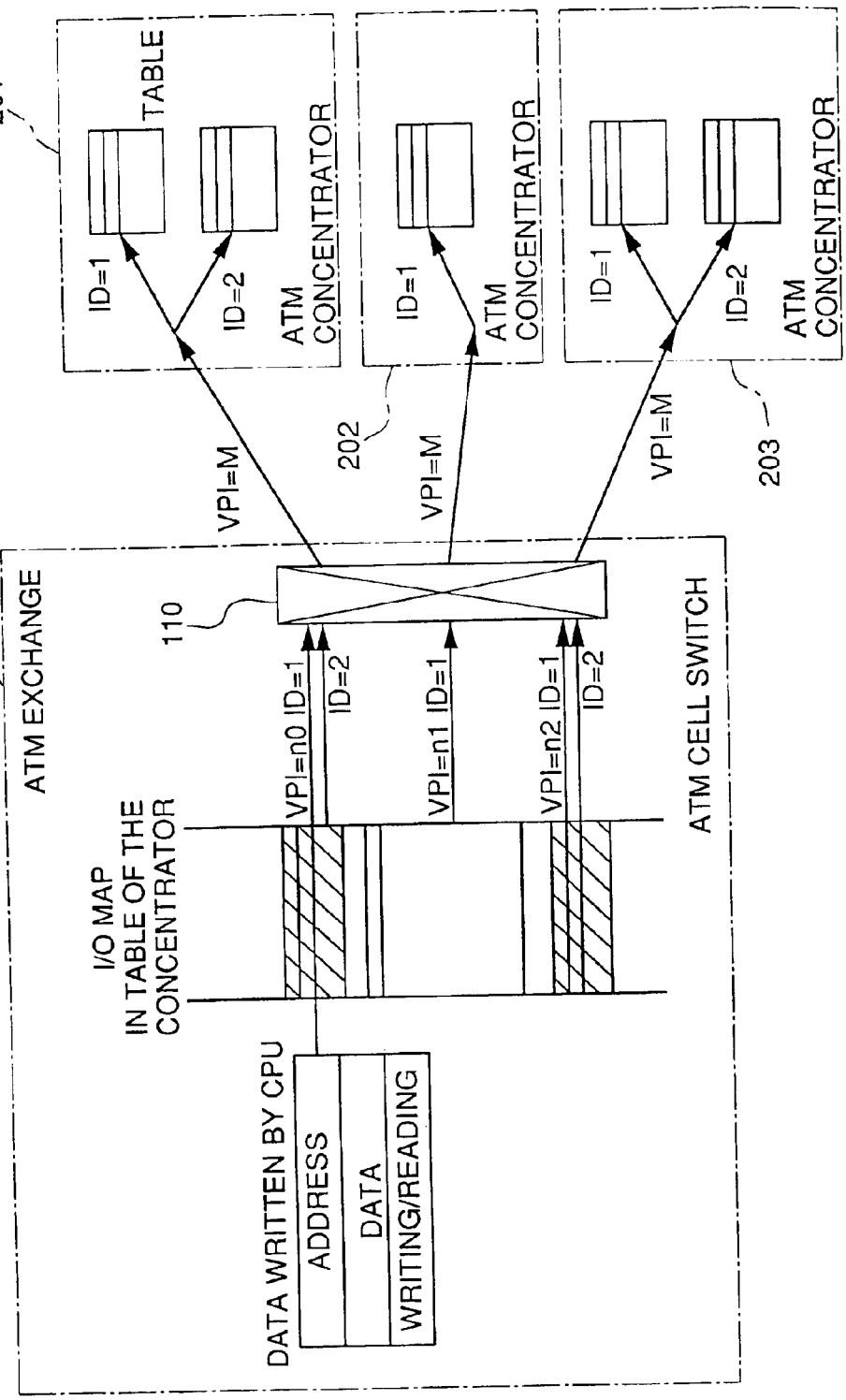
FIG. 5 is a diagram showing an allocation processing of a VPI and an ID in the subscriber network according to the first embodiment of the present invention.

FIG. 5 is a diagram showing an allocation processing of the VPI and the ID in the subscriber network according to the first embodiment of the present invention. As shown in FIG. 5, in the subscriber network system, a plurality of ATM concentrators are connected to one ATM exchange 100.

One concentrator 201 is equipped with a plurality of line cards for receiving a number of subscribers, and each card includes a cell filter. Thus, the first embodiment of the present invention distributes VPI values (=n0, n1, n2) for respective cards and distributes Ids (=1,2) for specifying a filter table 230 in an apparatus. By processing as hereinabove described, the setting can be conducted for a plurality of concentrators 201 to 203.

The first embodiment of the present invention can be applied to a setting operation in such a manner that a plurality of setting items which do not show that the dynamic change is set from the terminals of the control center, and only setting items (values of the filter table) which fluctuate as a function of time by signaling are set from the ATM exchange. The reasons for this is that the above setting process is not suitable for setting a number of items at one time.

Since an embodiment of the present invention does not depend on the communication of control information between control modules of the apparatus, it is necessary to communicate between complicated paths, such as communication between the signaling portion in the ATM exchange and the control modules, communication between control modules of respective apparatuses, and communication between the control modules in the ATM concentrators 200, 201 to 203, and the table setting portion of each line card. Accordingly, it is possible to rapidly reflect the setting of the transmission line obtained by the signaling processing to the ATM concentrators 200, 201 to 203.

In addition, since the processing which requires high speed does not use the control information communication of the upper layer, the high speed processing is not necessary for processing of the control information. Accordingly, it is possible to construct the control circuits in the ATM concentrators 200, 201 to 203 at a reduced cost, and, as a result, it becomes possible to construct the ATM concentrators 200, 201 to 203 at a reduced cost as well.

The first embodiment of the present invention is described for the case of setting filter information of the paths obtained by signaling processing. However, a parameter for monitoring the flow rate of the cell is another kind of information obtainable by the signaling processing, and it is possible to set the parameter for monitoring the cell flow rate for the ATM concentrators 200, 201 to 203.

Figure 6:
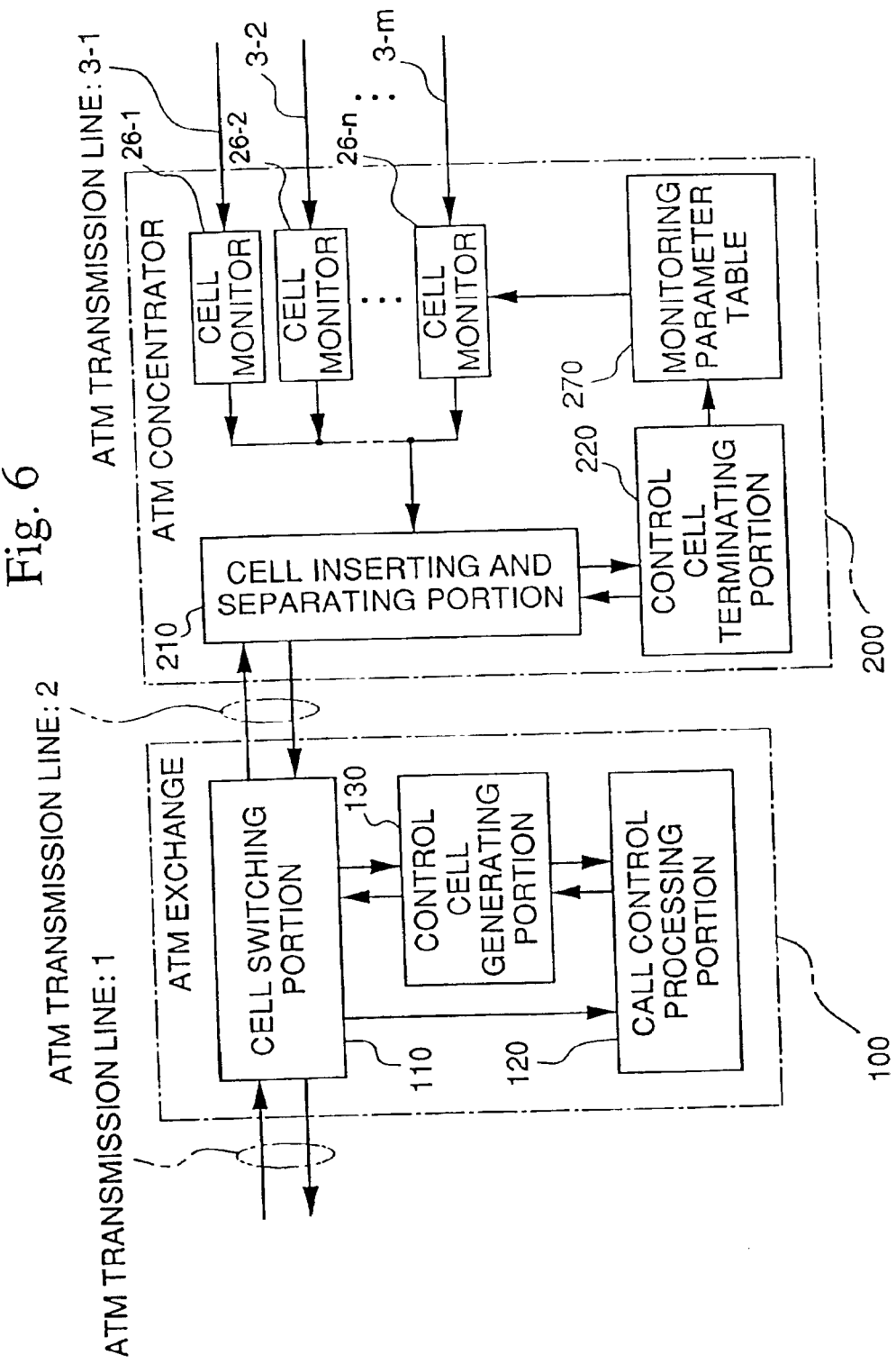
FIG. 6 is a block diagram showing the structure of the subscriber network system according to the second embodiment of the present invention.
Figure 7:
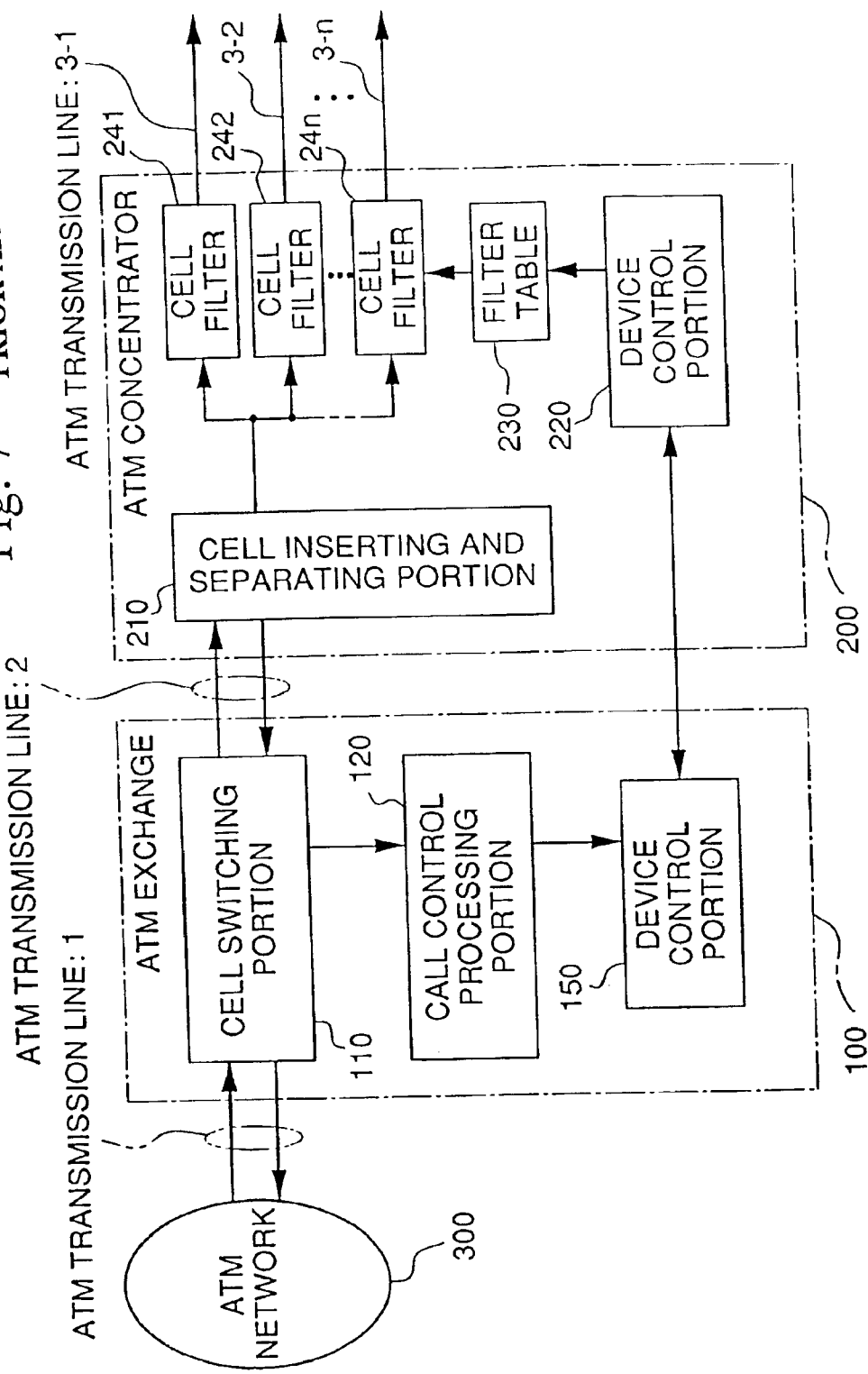
FIG. 7 is a block diagram showing the structure of the conventional subscriber network system.

FIG. 6 is a block diagram showing the structure of the subscriber network system according to the second embodiment of the present invention. As shown in FIG. 6, the constitution of the subscriber network system is the same as that shown in FIG. 1, except that cell monitoring portions 26-1 to 26-n and a monitoring parameter table 270 are provided for substituting for or adding to the cell filters 24-1 to 24-n and the filter table 230, and the same reference numerals are attached to the same elements. Operations of the same constituting the first embodiment.

The cell monitoring portions 261 to 26n perform monitoring of the cell flow rate. The ATM concentrator 200 is used for multiplexing the ATM signals from a plurality of subscribers and it is necessary for the safe operation of the network to prevent an influx of excessive cells which exceed reports from the subscribers. For that purpose, the cell flow rate must be monitored by the ATM concentrators 200, but the parameters allowed for the practically established transmission paths are only known by the ATM exchange 100, because the parameters are determined at the time of signaling and the values are different for each call.

Accordingly, it becomes possible to rapidly reflect the results of setting to the cell monitoring portions 261 to 26n by rewriting the content of the monitoring parameter table 270 of the ATM concentrator 200 when the parameter value after signaling processing differs from the prescribed value set in the ATM concentrator 200.

As described above, since there is one set of the address and data in formatting the ATM cell, if the data setting region is smaller than the 48 bites of the payload of the ATM cell, the transmission band is used in vain. Thus, it is possible to practice mapping a plurality of data sets. In this case, a field is added for embedding the number of data sets to the setting data and a register is provided at the receiving portion for storing a plurality of data sets.

As hereinabove described, as a result of the call control processing (signaling processing), the control cell generating portion 130 of the ATM exchange 100 generates an ATM controlling cell which includes an ATM cell containing the filter table 230 for setting in the ATM concentrator 200 and the address and data in the monitoring parameter table 270 by mapping, and sends the ATM controlling cell to the ATM concentrator 200. Furthermore, The ATM concentrator 200 extracts, at the control cell end portion 220, addresses, data, and R/W information from the ATM controlling cell, so that the response time from the call setting can be reduced by directly rewriting the table to be set (the filter table 230 and the monitor parameter table 270) such that the table for setting in the ATM concentrator 200 is rewritten directly from the ATM exchange 100. Therefore, a subscription network system is obtained which is capable of reducing the response time and reducing the device cost.

As described above, the present invention provides effects in a subscriber network system, which is constructed by the exchange arranged in the central station and the concentrators located at remote locations, that the system is capable of reducing the response time and reducing the device cost by integrating setting information to be set in the concentrators in the cell data and sending the integrated information from the exchange to the concentrators, and by rewriting setting information in the concentrators by extracting setting information in the cell data sent from the exchange.

What is claimed is:

1. A subscriber network system comprising an exchange disposed in a central station and concentrators arranged at remote locations, the subscriber network system comprising:

a cell generator disposed in said exchange, the cell generator configured to integrate into cell data setting information to be set in said concentrators and to send the cell data to said concentrators; and a control cell terminator disposed in each of said concentrators, the control cell terminator configured to extract said setting information from said cell data supplied from said cell generator for rewriting setting information in said concentrators, wherein the concentrators concentrate signals from a set of down stream transmission lines to a number of lines less than aid set of downstream transmission lines, and wherein the exchange communicates with the concentrators on one end and a backbone network on another end.

2. The subscriber network system according to claim 1, wherein receiving and sending of said cell data between said exchange and said concentrators are carried out by an asynchronous transfer mode.

3. The subscriber network system according to claim 1, the subscriber network system further comprising in each concentrator of the concentrators:

a cell filter configured to distribute a cell for each subscriber responding to a virtual path identifier; and a cell filter table configured to store the setting information for said cell filter;

wherein, the subscriber network system is constructed such that the content of said cell filter is rewritten by the setting information which said control cell terminator has extracted from said cell data.

4. The subscriber network system according to claim 1, the subscriber network system further comprising in the concentrators:

a cell monitor configured to monitor a flow rate of the cell for the signals from the subscribers, and a monitoring parameter table configured to store the setting information for said cell monitor, wherein the subscriber network system is constructed such that said control cell terminator rewrites the content of said monitoring parameter table according to the setting information which said control cell terminator extracts from said cell data.

5. The subscriber network system according to claim 4, wherein said control cell generator is constructed such that it integrates at least one of the setting information of said cell filter table obtained by a call control processing in said exchange and the setting information of said monitoring parameter table.

6. A method of setting information in a concentrator of a subscriber network system comprising an exchange disposed in a central station and concentrators located at remote locations, the method comprising:

integrating setting information to be set in the concentrators in cell data and sending the integrated cell data to said concentrators; and extracting said setting information in said integrated cell data supplied from said exchange and rewriting setting information installed in said concentrators, wherein the concentrators concentrate signals from a set of down stream transmission lines to a number of lines less than said set of downstream transmission lines, and wherein the exchange communicates with the concentrators on one end and a backbone network on another end.

7. The method of setting information in the concentrators according to claim 6, wherein receiving and sending of said cell data between said exchange and the concentrators are carried out in a asynchronous transfer mode.

8. The method of setting information in the concentrators according to claim 6, wherein each of said concentrators comprises:

a cell filter for distributing the cell for each subscriber responding to the virtual path identifiers; and a cell filter table for storing setting information for said filter;

wherein the content of said cell filter table is rewritten by the setting information extracted from the cell filter.

9. The method of setting information in the concentrator according to claim 6, wherein said concentrator comprises:

a cell monitoring means for monitoring the flow rate of the cell for the signals from the subscribers; and a monitoring parameter table for storing the setting information for said cell monitoring means;

wherein the content of said monitoring parameter table is rewritten by the setting information extracted from said cell data.

10. The method of setting information in the concentrator according to claim 9, wherein the method comprises the step of:

integrating at least one of the setting information of said cell filter table obtained by the call control processing in said exchange and the setting information of said monitoring parameter table.

* * * * *

UNITED STATES PATENT AND TRADEMARK OFFICE
CERTIFICATE OF CORRECTION

PATENT NO.   : 6,891,844 B1
DATED        : May 10, 2005
INVENTOR(S)  : Hiroshi Ueno It is certified that error appears in the above-identified patent and that said Letters Patent is hereby corrected as shown below:

<u>Column 8,</u>
Line 30, change the word "aid" to -- said --.

Signed and Sealed this

Nineteenth Day of July, 2005

JON W. DUDAS
*Director of the United States Patent and Trademark Office*